G. REHFUSS.
Feed Adjusting Device for Sewing Machines.

No. 52,932. Patented Feb. 27, 1866.

WITNESSES
C. B. Price
John Parker

INVENTOR
G. Rehfuss
By his attorney
J. C. Howson

UNITED STATES PATENT OFFICE.

GEORGE REHFUSS, OF PHILADELPHIA, PENNSYLVANIA, ASSIGNOR TO HIMSELF, C. S. PATTERSON, E. VINCUS, A. HART, M. MOORE, A. MITCHELL, AND A. H. REED, OF SAME PLACE.

IMPROVEMENT IN FEED-ADJUSTING DEVICES FOR SEWING-MACHINES.

Specification forming part of Letters Patent No. 52,932, dated February 27, 1866.

*To all whom it may concern:*

Be it known that I, GEORGE REHFUSS, of Philadelphia, Pennsylvania, have invented an Improvement in Feed-Regulating Devices for Sewing-Machines; and I do hereby declare the following to be a full, clear, and exact description of the same, reference being had to the accompanying drawings, and to the letters of reference marked thereon.

My invention consists of an eccentric disk which may be adjusted to regulate the movement of the feed-plate, and which is constructed, as fully described hereinafter, so that it may be readily adjusted to any desired position and retained in its position after adjustment.

In order to enable others skilled in the art to make and use my invention, I will now proceed to describe its construction and operation.

Figure 1:
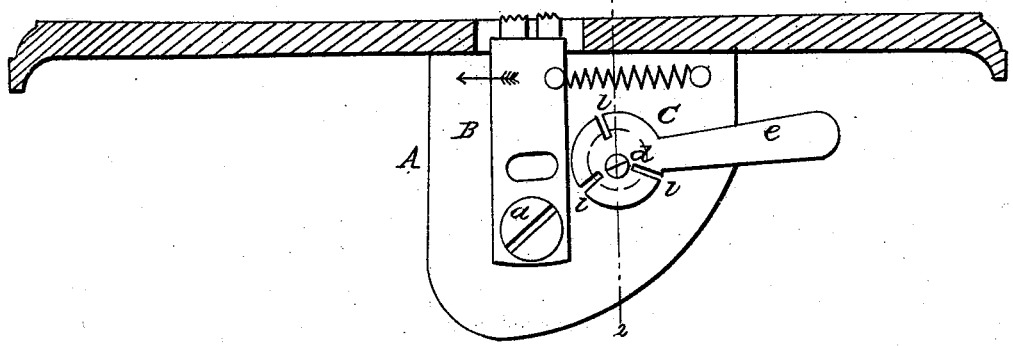
Figure 2:

On reference to the accompanying drawings, which form a part of this specification, Figure 1 is a sectional view of sufficient of a sewing-machine to show the feed mechanism with my improved regulating device, and Fig. 2 a section on the line 1 2, Fig. 1.

A is a plate, the upper edge of which is secured to the base-plate of a sewing-machine, and to a pin, $a$, on which is hung an arm, B, the upper serrated end of the latter projecting through a slot in the bed-plate.

The arm B is so connected to operating parts of the machine that its upper serrated edge will be raised in the slot, brought against the under side of the fabric, moved a short distance in the direction of the arrow, Fig. 1, (causing the fabric to slide a corresponding distance on the bed-plate,) and will then be depressed and returned to its first position prior to again rising and moving the fabric as before.

As the arm B vibrates its motion in one direction is limited by a disk or eccentric, C, against the edge of which the arm strikes, the said disk being concave and being secured with its concave side against the plate A by a screw, $d$, which passes through the disk at one side of the center of latter and into the plate.

In the disk are a number of slits, $i$ $i$, which extend from the edge toward the center of the same, and to the disk is secured an arm, $e$, by means of which it may be turned.

Eccentric disks have been heretofore used for regulating the movement of the feed-plate; but great difficulty has been experienced in so securing the disk that it will remain in the position to which it may be adjusted without bearing so firmly on the plate A as to be difficult to adjust.

By making the disk C concave and slitting the same, as above described, it may be made to bear firmly against the plate A, so as not to be jolted from its position, and yet may be readily adjusted when required.

It will be seen that the device is exceedingly simple, and much less expensive and more efficient than those in which rubber washers and other devices are used for effecting the same object.

I claim as my invention and desire to secure by Letters Patent—

The concave disk C, with its slits $i$ $i$ and arm $e$, constructed and combined with the feed device of a sewing-machine, substantially as and for the purpose specified.

In testimony whereof I have signed my name to this specification in the presence of two subscribing witnesses.

GEO. REHFUSS.

Witnesses:
CHARLES E. FOSTER,
JOHN WHITE.